United States Patent [19]

Lindsay et al.

[11] Patent Number: 4,878,845
[45] Date of Patent: Nov. 7, 1989

[54] DEVICE FOR ENCOURAGING CHILDREN TO BRUSH THEIR TEETH REGULARLY

[75] Inventors: Tom E. Lindsay, 1037 S.W. Lake Front Rd., Lake Oswego, Oregon 97034; James C. Smith, Hayward, Calif.

[73] Assignee: Tom E. Lindsay, Lake Oswego, Oreg.

[21] Appl. No.: 167,395

[22] Filed: Mar. 14, 1988

[51] Int. Cl.⁴ .................... G09B 1/20; G09F 9/00; G09F 11/00
[52] U.S. Cl. .................... 434/238; 434/403; 40/503; 40/111; 235/110
[58] Field of Search .................. 434/238, 403; 40/111, 40/503; 211/79; 273/155; 235/110

[56] References Cited

U.S. PATENT DOCUMENTS

| D. 184,055 | 12/1958 | Johnson | D1/2 |
| 2,401,162 | 9/1944 | Kaufman | 40/111 |
| 2,801,054 | 7/1957 | Bach | 40/505 |
| 2,926,487 | 3/1960 | Stone | |
| 3,126,129 | 3/1964 | Weinberg | 222/94 |
| 3,473,239 | 10/1969 | Noseworthy | 35/21 |
| 3,564,741 | 2/1971 | Kahre et al. | 40/107 |
| 4,026,043 | 5/1977 | Caruso | 40/503 |

Primary Examiner—Edward M. Coven
Assistant Examiner—V. Szczepanik
Attorney, Agent, or Firm—Milton S. Gerstein

[57] ABSTRACT

A device for aiding and encouraging a child to brush his or her teeth regularly. The device is provided with a pair of nonrotatable shafts each of which mounts seven rotatable blocks shaped like a molar tooth, each block representing either the morning or night of a particularly day during which a child should brush his teeth. The front surface faces of the blocks form a frowning mouth with dirty teeth, while the rear surface faces form a pattern of a smiling mouth with white teeth after all of the blocks have been rotated 180 degrees. Each block is rotated to expose a portion of the smile and to remove a portion of the frown after each tooth brushing in the morning and evening of each day.

11 Claims, 3 Drawing Sheets

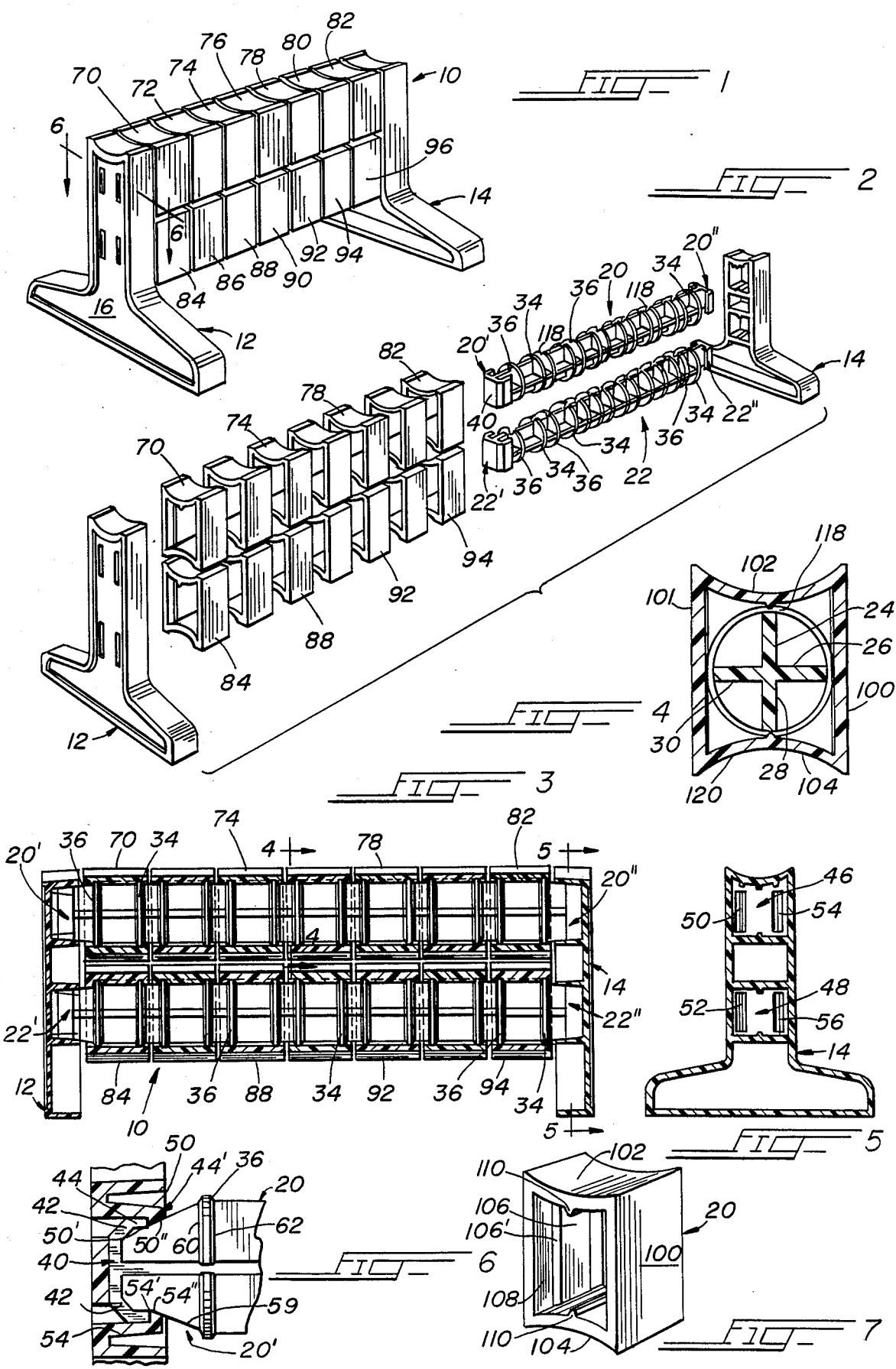

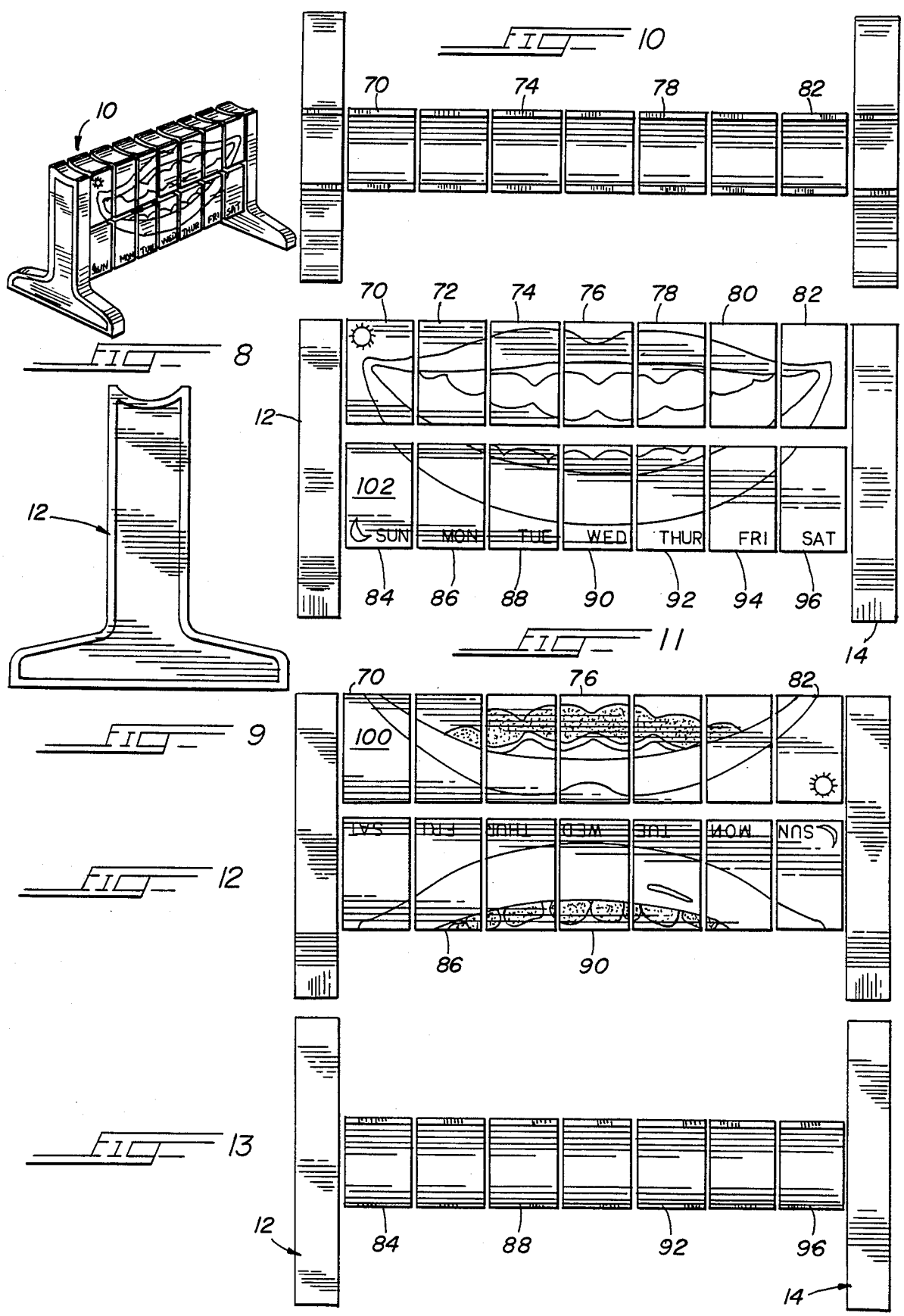

DEVICE FOR ENCOURAGING CHILDREN TO BRUSH THEIR TEETH REGULARLY

BACKGROUND OF THE INVENTION

The present invention is directed to a device for encouraging children to brush their teeth regularly, and specifically twice a day. The benifits and necessity of proper and consistent dental hygiene are well-known. However, it is ofttimes a different task to have a child brush his or her teeth on regular basis. The present invention is directed toward the very end of encouraging a child to brush his teeth regularly by providing a device that the child himself controls, which device will keep track of his brushing during the entire week, and will also allow for the child to play a game with the device during such schedule recording, which will make tooth-brushing fun by the incentive of allowing the child to play one part of the game only after such brushing.

SUMMARY OF THE INVENTION

It is the main objective of the present invention to provide a device that is completely controllable by a child, in order to encourage him or her to brush his or her teeth regularly, and, preferably, twice a day.

It is another objective of the present invention to provide such a device that will encourage the child to brush his teeth by visibly recording each semi-daily brushing, for the entire week, so that the child will reconize and note his achievement.

It is yet another objective of the present invention to provide such a device that will amuse the child during such recording of semi-daily brushings, and will encourage him to continue regular brushing in order to be able to enjoy the playing of the device after each brushing.

Toward these and other ends, the device of the present invention for aiding and encouraging children to brush their teeth is comprised of a stand having a pair of end-supporting columns, which fixedly and non-rotatably mount therebetween a pair of parallel, vertically-separated shafts. Rotatably mounted on each shaft are, in the prefered embodiment, seven record-keeping indicator-blocks preferably in the shape of a molar for added emphasis as to the nature and use of the device. Each indicator-block represents half of a day; each indicator-block on the upper shaft indicates the morning brushing for a respective day, while each indicator-block on the bottom shaft indicates the afternoon of night brushing for the respective day. Starting from Sunday morning, before the morning brushing thereof, the beginning of the cycle is started, and the front faces of the two rows of indicator-block will form a frown-shaped mouth design displaying dark or dirty teeth. After each semi-daily brushing, the child will rotate the respective molar indicator-block 180 degrees, starting with the Sunday morning indicator-block, then the Sunday afternoon indicator-block, the Monday morning indicator-block, and so forth, until finally on Saturday night, all of the molar indicator-blocks have been rotated, to now show a mouth design displaying a smile with completely white teeth. Each molar indicator-block has a front surface, upon which is formed part of the mouth design forming a frown and displaying dark or dity teeth, and a rear surface, upon which is formed part of the mouth design forming a smile and displaying white teeth. As each molar indicator-block is rotated after each brushing, part of the frown is replace with part of the smile, starting at the left and working toward the right as the daily brushing progress. Each shaft generally consits of four fins or radial walls emanating from a common longitudinal center line, and has spaced therelong a plurality of circular disc. Each rotatable molar-indicator has a pair of surface locators for locating the respective indicator-block between a pair of the discs to prevent dislocation along the shaft, and an interior hollow chamber housing the pair of surface locators and also having inner walls defining bearing surfaces which contact the outer peripheral edge surface of a respective pair of discs, which thereby allows for the rotation of the respective molar-indicator about the respective pair of discs. Each discs id also provided with a pair of V-shaped notches spaced 180 apart, corresponding to the two states of the molar indicator-blocks, which selectively recieve therein a rib or beaded portion formed in at least one of the upper and lower interior wall surfaces of the interior hollow chamber of the respective molar indicator, which rib holds the respective indicator in its state until forced out therefrom during the next rotation.

BRIEF DESCRIPTION OF THE DRAWING

The invention will be more readily understood with reference to the accompanying drawings, wherein:

FIG. 1 is an isometric view of the device of the present invention;

FIG. 2 is an exploded assembly view showing the assembly of the molar indicator-blocks on the two shafts;

FIG. 3 is a longitudinal cross-sectional view of the device of FIG. 1;

FIG. 4 is a cross-sectional view taken along line 4—4 of FIG. 3;

FIG. 5 is a cross-sectional view taken along line 5—5 of FIG. 3;

FIG. 6 is a cross-sectional view taken along line 6—6 of FIG. 1;

FIG. 7 is an isometric view of a rotatable molar indicator-block of the device of FIG. 1;

FIG. 8 is an isometric view similar to FIG. 1 showing the front surfaces of the plurality of molar indicator-blocks having a mouth design in the shape of a smile formed thereon, which is the state of the device at the end of each weekly cycle of brushings;

FIG. 9 is a sife elevation view of the device of FIGS. 1 and 8;

FIG. 10 is a top view of the device

FIG. 11 is a front view of the device, showing the smile and white teeth;

FIG. 12 is a rear view of the device, showing the two parts that form the mouth design showing a frown with dark or dirty teeth;

FIG. 13 is a bottom view of the device;

DETAILED DESCRIPTION OF THE INVENTION

Figure 14:
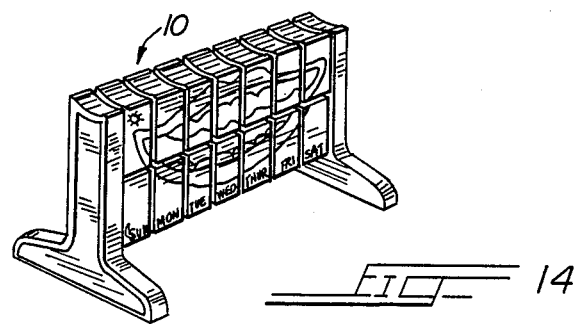
FIG. 14 is an isometric view similar to FIGS. 1 and 8, but showing the front of the device at the beginning of each weekly cycle, with the mouth design in the form of a frown shown in its entirety.
Figure 15:
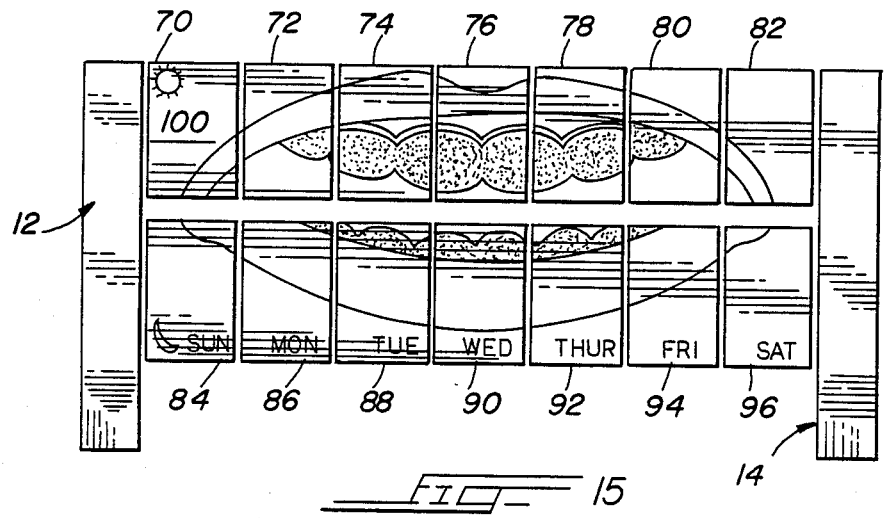
FIG. 15 is a front view of the device showing the mouth design in the form of a frown; and of the device
Figure 16:
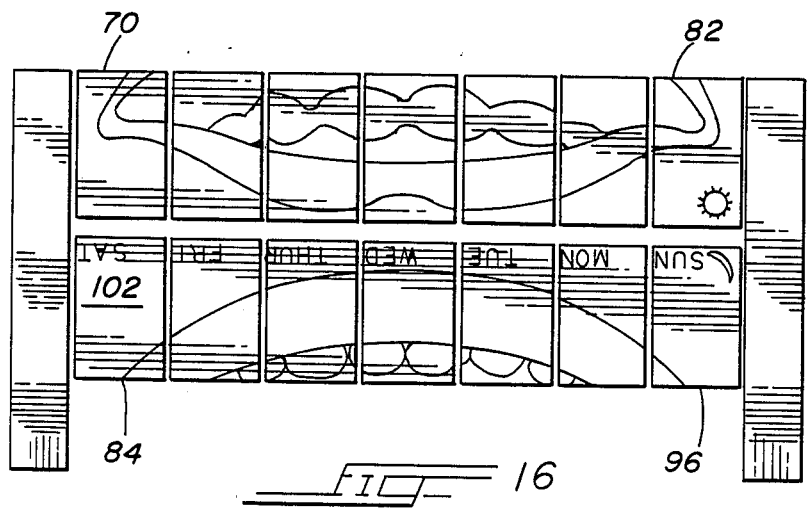
FIG. 16 is a rear view showing the two parts making up the mouth design of FIG. 10 in their position at the start of each weekly cycle.

Referring now to the drawings in greater detail, the device for recording and encouraging tooth-brushing is indicated generally by reference numeral 10. The stand 10 has a pair of end-posts or columns 12, 14 for supporting the device in a standing position. Each column 12, 14 is provided with a recessed outer wall surface 16, in which may be affixed a decal, label, or the like, for promotional advertisement, trademark, and the like. The two end posts or columns support therebetween a pair of parallel, horizontally-disposed, vertically-spaced art sationary shafts 20, 22. Each shafts 20, 22 is made up of four fins or wall blades 24, 26, 28, 30, best seen in FIGS. 2 and 4, with each wall blade originating at a common longitudinal center line, as clearly shown in FIG. 4. Arrayed concentrically about each shaft are a plurality of vertically-disposed, parallel, circular discs. Each shaft is provided with a plurality of pairs of such circular discs, the discs of each pair being indicated by reference numerals 34, 36, the disc 34 being the right one of the respective pair, and the disc 36 being the left of the respective pair, when viewing FIG. 2. In the preferred embodiment, the space between the discs 34, 36 in each pair is 0.4 inches, with adjoining discs of different pairs being spaced apart 0.13 inches. Each end of each shaft is provided with a locking surface for locking engagement with a portion of the inner surface of a respective end post, best seen in FIG. 6 for the shaft 20 and its end 20'. The end 20' is provided with angled end wall 40 defining cant wall portions 42 terminating in horizontal legs 44, each leg 44 defining an edge wall surface 44' which are the locking surfaces for locking the shaft to the column. The other ends 20", 22' and 22" are similarly structured. Each column is provided with two vertically-spaced apart detent structures 46, 48, each detent structure having a first detent arm 50, 52, and a second dentent arm 54, 56, respectively, with the two detent arms of each structure forming an opening therebetween for the reception of a respective end of a shaft, as clearly shown in FIG. 6. Each detent arm is provided with a catch or lip, similar to the lips 50', 54' of the upper structure, by which the locking surfaces 44' are engaged and locked in place, and prevented from moving outwardly. During insertion, the cant wall surfaces 42 push the detent arms apart to allow for construction of the assembly, and for the snap-fit to take place by locking engagment between the aforementioned locking surfaces 44' and 50', 54'. Each lip 50', 54' is provided with a similarly canted surface 50", 54" for mating contact with the canted wall surface 42 to achieve camming action to spread the detent fingers apart. The respective end of each shaft also defines a similarly sloped surface 59 against which the cant surfaces 50", 54" abut during locked engagment.

Each disc has a radius slightly greater than the width of a wall or vane 24, 26, 28, 30, so that the circumferential edge of each disc project outwardly beyond the longitudinal edge surface of each vane for a full 360 degree. Each circular disc also has chamfered edge surfaces 60, 62 as best seen in FIG. 6 for the left-most disc 36, which chamfered surfaces aid in the assembly of the rotatable elements described below in greater detail, each chamfered surface preferably being 45 degrees. Also, in the preferred embodiment, each disc is of a diameter of 0.62 inches, while each vane has a width of 0.27 inches measured from the common longitudinal center line outwardly to the outer edge surface thereof. Each of the shafts 20, 22 rotatably mounts seven molar-shaped indicator-blocks 70–82 and 84–96, respectively. Each of these blocks defines a front surface face and a rear surface face, so that by rotating each block 108 degrees, either the front or rear surface face is visible fo a viewer from the front. Formed on the front surface faces of these fourteen blocks is a mouth design formed in the shape of a frown with dark or dirty teeth, as shown in FIGS. 14 and 17. Each of the front surface faces of the lower blocks 84–96 also has written thereon one day of the week, in succession, with the first block 84 also having a sign or symbol for the afternoon or night, which, in the preferred emboidment shown in FIG. 17, is a cresent. The first block 70 of the upper block has the symbol or sign of the morning, which in the preferred embodiment is a sun. This arrangement is meant to represent the tooth-brushing of a child during the week; the upper row of blocks represents the morning brushings, while the lower row of blocks represents the afternoon or night brushings, with two blocks in the same vertical column being indicative of the same day. Thus, starting on Sunday morning, when the assumed weekly brushing cycle starts, the blocks will be visible as shown in FIGS. 14 and 17, with the frown being displayed. After the Sunday morning brushing, the child rotates the block 70 180 degrees to expose the rear surface portion of the block 70, which automatically removes a portion of the frown and replaces it with a portion of the smile. After the Sunday night brushing, the block 84 is rotated 180 degrees; after the Monday morning brushing, the block 72 is rotated 180 degrees, and so on. FIG. 18 shows the pattern formed on the rear surface faces of the blocks, which pattern is actually divided into two inverted forms, which, when all of the blocks have been rotated on Saturday night after the last brushing of the weekly cycle, forms the mouth design shown in FIGS. 8 and 11, which is a smile with white teeth, to indicate the achievement performed by the child. As can also be seen in FIG. 18, the rear surface faces of the lower blocks also are provided with an inverted day indicator, so that when they are rotated 180 degrees, the column-day will still look as that shown in FIG. 17. FIG. 12 shows the frown design of 17 after each of the blocks has been rotated 180 degrees at the end of the weekly cycle, such frown design now being two inverted halves of the frown design. At the start of the cycle, each of the blocks is again rotated so as to positioned each block out of the position shown in FIG. 12 to the position shown in FIG. 17. Thus, the two designs allow for fun to be had for the child during his brushing time each day, and also serve as reminders to the child if a day or half-day brushing has or had been missed.

Referring now to FIG. 7, each block is constructed simiarly, block 70 in FIG. 7 being shown by way of example. The block 70 has an outer or front surface face 100 upon which is formed part of the frown design of FIG. 17, and an inner or rear surface face 101 upon which is formed part of the smile design of FIG. 11. Arcuate upper and lower wall surfaces 102, 104 join the front and rear surface faces at the edge-surfaces thereof. The concave shape of arcuate surfaces 102, 104 permit rotational clearance between upper and lower rows of indicator-blocks while maintaining a minimum horizontal gap between said rows thus enhancing the graphic continvity of smile and frown. Such concave shape also serves as a finger hold to facilitate rotation of the indicator-blocks. The block 70 is hollow within to allow for the passage therethrough of a respective shaft 20, 22. The hollow interior of the block is delimited by the interior surfaces of the four outer walls above-described. Each of the interior wall surfaces of the front and rear surface walls 100, 101 have a substantially rectilinear-shaped solid member 106 which serve as stop to prevent the unwanted or accidental removal of the block 70 from its location between a pair of circular discs 34, 36. The length of each member 106 is in the preferred embodiment 0.38 inches, which length is taken in the direction parallel to the respective shaft, which compares with the 0.4 inches separation between each pair of discs 34, 36. The lateral distance between the opposing surface faces of the members 106 in each block is 0.605 innches, which compares with the 0.62 inches diameter of each disc, so that each block is force-fit onto the respective shafts, which is achieved since the structure per se are made of plastic, thus allowing for appropriate flexure and distortion of the members to accomodate assembly. Preferably, each member 106 also had a pair of opposing chamfered side surfaces 106' that cooperate with the chamfered surfaces 60, 62 of the discs to aid the assembly process. The interior surfaces proper of the front and rear surface faces of the block define bearing surfaces which contact the outer circumferential edge surface of the respective discs, which bearing portions are those portions of the interior surfaces on either side of the solid member 106, and indicated by reference numeral 108. The total length of each block is, in the perferred embodiment, 0.62 inches, which length is parallel to the length of the respective shaft, which compares with the 0.4 inch spacing between the discs of each pair, and the 0.13 inches of separation between adjoining discs of different pairs. With a thickness of each disc of 0.067 inches, it may be seen that each of the adjoining blocks on a respective shaft lie in very close proximity to each other and almost touch, in order to form a more perfect image for the designs when viewed. As can be seen in FIG. 3, each block extends over the respective disc of the associated pair, so that the shafts and discs are, for all intents and purposes, not visible from the top of sides of the device. Each block is also formed with at least one rib or beaded portion 110 formed on an interior surface of at least one of the upper and lower arcuate connecting walls,. These ribs extend along these interior surfaces preferably from edge-to-edge, though the critical portion is that adjacent the edges thereof. These ribs are recieved in V-shaped notches or grooves 118, 120, (see FIGS. 2 and 4) formed in the upper and lower circumferential portions of each disc 34, 36, with the groove 118 being arcuately spaced from the groove 120 by 180 degrees, which locations represent the two stable states of the blocks after rotation. The ribs 110 snap into place in these notches or grooves to thus hold the block in that state, until a slight forces is applied by the child to overcome this resistance, to thereby allow rotation of the block. While the preferred embodiment has been shown utilizing two rows of blocks, each row having seven indicator blocks, it is within the purview of the present invention to provide more or less than two rows, as well as more or less than seven indicator blocks per row. Each of the frown and smile designs may be formed on the respective surface faces by heat transfer techniques, or the equivalents thereof.

While a specific embodiment of the invention has been shown and described, it is to be understood that numerous changes and modifications made be made without departing from the scope and intent of the invention as set forth in the appended claims.

What we claim is:

1. A device for aiding and encouraging a child to brush his teeth, comprising;
    a mounting frame;
    a pair of shafts nonrotatably mounted by said mounting frame;
    a plurality of independently and individually rotatable, spaced-apart blocks each mounted for independent and separate rotation about a respective one of said pair of shafts;
    each said shaft being mounted horizontally by said mounting frame, said shafts being mounted parallel to each other and vertically spaced apart; each said shaft mounting a plurality of said blocks for said independent and individual rotation in spaced-apart relationship; said blocks thus defining a first row and a second row, said rows being positioned very close to each other; and
    each said block comprising an upper concave exterior surface and a lower concave exterior surface, so that the first row of blocks may be positioned very close to said second row of blocks and allow for the independent and separate rotation of each block with respect to the juxtapositioned block in the other row;
    each said block having a front surface face and a rear surface face; each said front surface face comprising a printed design forming a portion of a frowning mouth; and each said rear surface comprising a printed design forming a portion of a smiling mouth.

2. A device for aiding and encouraging a child to brush his teeth, comprising:
    end column means;
    a pair of shaft means nonrotatably mounted by said end column means;
    a plurality of indepently and individually rotatable, a spaced-apart block means each mounted for independent and separate rotation about a respective one of said pair of shafts means;
    each said shafts means being mounted horizontally by said end column means, said shafts means being mounted parallel to each other and vertically spaced apart; each said shaft means mounting a plurality of said blocks means for said independent and individual rotation in spaced-apart relationship;
    each said shaft means comprising a central longitudinal section, and a plurality of pairs of circular disc means spaced apart along said central section, each said disc means having a diameter greater than diametric extension of said central longtudinal section; each said pair of disc means positioning therebetween at least a portion of a respective said block means to prevent movement of said respective said block means therepast, each said pair of disc means retaining the respective said block means in spaced relationship from an adjoining said block means;
    each said block means further comprising a hollow interior in which is received a respective said pair of disc means.

3. The device according to claim 2, wherein each said block means comprises a front surface face and a rear surface face; each front surface face comprising a portion of a mouth design forming a frown, and each said rear surface face comprising a portion of a mouth design forming a smile after said block means have been rotated 180 degrees, said front surface faces of all of said block means together forming said frown design when said front surface faces all lie in approximately the same plane, and said rear surface faces of all of said block means together forming said smile design when said rear faces all lie in approximately the same plane and after said block means have been rotated 180 degrees.

4. The device according to claim 2, wherein said hollow interior comprises a plurality of inner wall surfaces, said respective pair of disc means being juxtapositioned within said hollow interior opposite portions of said inner wall surfaces by which said block means is rotated relative to said pair of disc of disc means.

5. The device according to claim 4, wherein at least one of said inner wall surfaces comprises rib means, and each said disc means of each said pair of disc means comprises a pair of cooperating notches for recieving therein respective said rib means, said pair of notches being arcuately spaced apart 180 degree and both said notches lying substantially in the same vertical plane, whereby each said block means may be rotated between two stable states in each of which the respective said rib means engages a respective said notch to hold said block means in place in said state.

6. The device according to claim 2, wherein said central section comprises a plurality of wall vanes emanating from a common longitudinal center line, said center line being coextensive with the center of said plurality of disc means.

7. The device according to claim 2 wherein each said hollow interior is defined by interior wall surfaces, at least one interior wall surface having a solid member protruding inwardly toward the opposite interior wall surface in order to serve as a stop to the removal of the respective said block means from between a respective said pair of disc means.

8. The device according to claim 7, wherein each said disc means comprises at least one chamfered surface, and each said solid member also comprising a similar chamfered surface for cooperating with a respective said chamfered surface of one said disc means during assembly, so that each said block means may be mounted about said shaft means after having cleared at least one said disc means by said chamfered surfaces causing bending to the associated contacting parts.

9. The device according to claim 8, wherein the distance between two oppositely-disposed solid members of each said block means is less than the diameter of at least some of said disc means, whereby said chamfered surfaces allow for the assembly whereby of said block means on said shaft means after having cleared said disc means by forcing said block means therepast.

10. The device according to claim 2, wherein each said front face of the lower block means comprises matter to indicate the day of the week, said lower shaft mounting seven said block means, and said upper shaft mounting seven said block means; each said rear face of each of said lower block means having similar matter but inverted so that when the respective block means is rotated, the inverted matter is situated upright.

11. The method of encouraging and aiding a child to brush his teeth, in which there is provided a device having a plurality of independently rotatable block members with each block member defining a front surface face and a rear surface face, each front surface face having formed thereon a portion of a mouth design shaped as a frown, or the like, and each rear surface face having formed thereon a portion of a mouth design shaped as a smile, or the like, wherein said method comprises:

arranging all of the front surface faces in approximately the same vertical plane so that the frown design is completed and visible from the front;

rotating an end-most one of the block members after a child brushes his teeth at the beginning of a brushing cycle to replace a portion of the frown design with a portion of the smile design;

rotating another block member next to the endmost block member after the same child has brushed his teeth at the end of the first interval of said brushing cycle;

rotating the next-to-be-rotated block member after the same child has brushed his teeth at the end of the second interval of said brushing cycle to replace still another portion of the frown design with the smile design; and rotataing each remaining block member after the same child has brushed his teeth at the end of each subsequent time interval, respectively, in progression, until, at the end of said brushing cycle, all of the rear surfaces having the smile design now face frontward to display a complete smile.

* * * * *